(12) United States Patent
Beckwith et al.

(10) Patent No.: US 11,415,401 B2
(45) Date of Patent: Aug. 16, 2022

(54) APPARATUS FOR SUPPORTING A MEASURING TAPE FOR DISPLAY AND PACKAGING ASSEMBLY ASSOCIATED THEREWITH

(71) Applicant: APEX BRANDS, INC., Apex, NC (US)

(72) Inventors: Jonathan Siebert Beckwith, Raleigh, NC (US); Cecil Wilson, Sanford, NC (US); Jimmy Shangyao Wei, New Taipei (TW); Kevin Fitzpatrick, Apex, NC (US); Brendan Michael Walsh, Holly Spring, NC (US)

(73) Assignee: APEX BRANDS, INC., Apex, NC (US)

( * ) Notice: Subject to any disclaimer, the term of this patent is extended or adjusted under 35 U.S.C. 154(b) by 180 days.

(21) Appl. No.: 16/731,137

(22) Filed: Dec. 31, 2019

(65) Prior Publication Data

US 2020/0208953 A1 Jul. 2, 2020

Related U.S. Application Data

(60) Provisional application No. 62/786,856, filed on Dec. 31, 2018.

(51) Int. Cl.
*G01B 3/1041* (2020.01)
(52) U.S. Cl.
CPC .................. *G01B 3/1041* (2013.01)
(58) Field of Classification Search
CPC .......... G01B 3/1041; G01B 2003/1074; G01B 2003/1076; G01B 3/1071; G01B 3/1003

USPC .......................................................... 33/769
See application file for complete search history.

(56) References Cited

U.S. PATENT DOCUMENTS

| | | | | | |
|---|---|---|---|---|---|
| 3,155,232 | A * | 11/1964 | Leone | ................ | B65D 73/0085 206/476 |
| 5,388,741 | A * | 2/1995 | Hillinger | ............. | G01B 3/1071 224/679 |
| 6,401,921 | B1 * | 6/2002 | Usami | ................. | E05B 73/0017 206/349 |
| 11,084,640 | B2 * | 8/2021 | Kooc | ................. | B65D 73/0064 |
| 2010/0314277 | A1 * | 12/2010 | Murray | ............. | B65D 73/0014 206/461 |
| 2020/0140170 | A1 * | 5/2020 | Kooc | ................. | B65D 73/0064 |
| 2020/0208953 | A1 * | 7/2020 | Beckwith | ............. | G01B 3/1003 |

FOREIGN PATENT DOCUMENTS

EP 2261135 A1 * 12/2010 ......... B65D 73/0014

* cited by examiner

*Primary Examiner* — Yaritza Guadalupe-McCall
(74) *Attorney, Agent, or Firm* — Burr & Forman LLP (57) ABSTRACT

A method of packaging a measuring tape device such that an internal feature of the measuring tape device is exposed may include supporting a housing of the measuring tape device on a base portion of an internal feature exposing holder, and proximate to a backing portion of the internal feature exposing holder, extending a portion of a blade of the measuring tape device from the housing to engage a hook capturing edge of an extension portion, and retaining the housing with the base portion and the backing portion such that a portion of the blade remains exposed.

20 Claims, 9 Drawing Sheets

APPARATUS FOR SUPPORTING A MEASURING TAPE FOR DISPLAY AND PACKAGING ASSEMBLY ASSOCIATED THEREWITH

CROSS REFERENCE TO RELATED APPLICATION

This application claims priority to U.S. application No. 62/786,856 filed Dec. 31, 2018, the entire contents of which are hereby incorporated by reference in its entirety.

TECHNICAL FIELD

Example embodiments generally relate to measuring tape devices, and particularly relate to a support structure for displaying a measuring tape that has part of the blade exposed while on display.

BACKGROUND

Measuring tapes have been around for a very long time, and are common measuring tools used in numerous contexts to obtain linear measurements. Measuring tapes can come in many forms and may be made of cloth, fiber glass, metal, plastic, or the like. The materials used are often dictated by the specific measuring application. For example, tailors and dressmakers typically use a flexible tape that can be easily manipulated between two hands to measure a distance therebetween. However, for construction or carpentry applications, a stiff and often metallic tape is preferred to allow the measuring tape to be extended between an a first location at which one end of the tape is anchored, and the location of the user at whose location the measuring tape is paid out from a reel assembly. The reel assembly may have a manual retracting mechanism or a self-retracting mechanism, typically depending upon the length of the measuring tape. For relatively short measuring tapes (e.g., 12 ft or 25 ft), self-retracting mechanisms are very common. For very long measuring tapes (e.g., larger than 100 ft), a manual retracting mechanism is typically employed.

For metallic tape ribbons that are employed with a reel assembly that has a self-retracting mechanism, the default position of the tape or blade of the device is retracted within the housing. Thus, the blade invariably reverts to the retracted state unless specific action is taken to extract the blade from the housing. Accordingly, when marketed or sold, the blades tend to be incapable of being viewed by a prospective buyer. To the extent the blade has unique features that could be attractive or influence sales in a positive way, those features would need to, at best, be displayed on a two dimensional image somewhere on the packaging. This is an undesirable situation for some modern advancements associated with measuring tape blades.

BRIEF SUMMARY OF SOME EXAMPLES

Some example embodiments may enable the provision of an improved support device for display of measuring tape devices, and packaging assembly associated therewith.

In an example embodiment, a, internal feature exposing holder assembly for exposing an internal feature of a measuring tape device retained in the assembly is provided. The assembly may include a base portion having a surface extending in a horizontal direction, a backing portion extending substantially perpendicularly away from the surface of the base portion, and an extension portion formed at one or both of the base portion and the backing portion. The extension portion may include a supporting face formed to extend away from the base portion to a hook capturing edge. A length of the supporting face may be longer than a length of a housing of the measuring tape device such that a portion of a blade of the measuring tape is exposed from the housing when an end hook of the measuring tape device is operably coupled to the hook capturing edge and the housing is supported, at least in part, by the base portion.

In another example embodiment, a method of packaging a measuring tape device such that an internal feature of the measuring tape device is exposed is provided. The method may include supporting a housing of the measuring tape device on a base portion of an internal feature exposing holder, and proximate to a backing portion of the internal feature exposing holder, extending a portion of a blade of the measuring tape device from the housing to engage a hook capturing edge of an extension portion, and retaining the housing with the base portion and the backing portion such that a portion of the blade remains exposed.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

FIG. 1, which is defined by FIGS. 1A and 1B, illustrates perspectives view of a measuring tape device in accordance with an example embodiment;

FIG. 3, which is defined by FIGS. 3A and 3B, illustrates a perspective view of a measuring tape device operably coupled to an internal feature exposing holder in accordance with an example embodiment;

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may relate to a method and apparatus for the display of a measuring tape device in such a way as to expose internal features of a three dimensional nature (e.g., the blade and any design elements provided thereon) when such features are otherwise normally retained internally be default and therefore typically only representable in two dimensions via images on the packaging of the product. This may be accomplished by employing an internal feature exposing holder designed specifically to overcome the default status of the device. However, the internal feature exposing holder may further be structured to support the internal feature (e.g., the blade) in a way that does not increase the likelihood of damage being inflicted on the blade or portions thereof. Thus, for example, only a limited portion of the blade may be exposed.

Figure 1A:
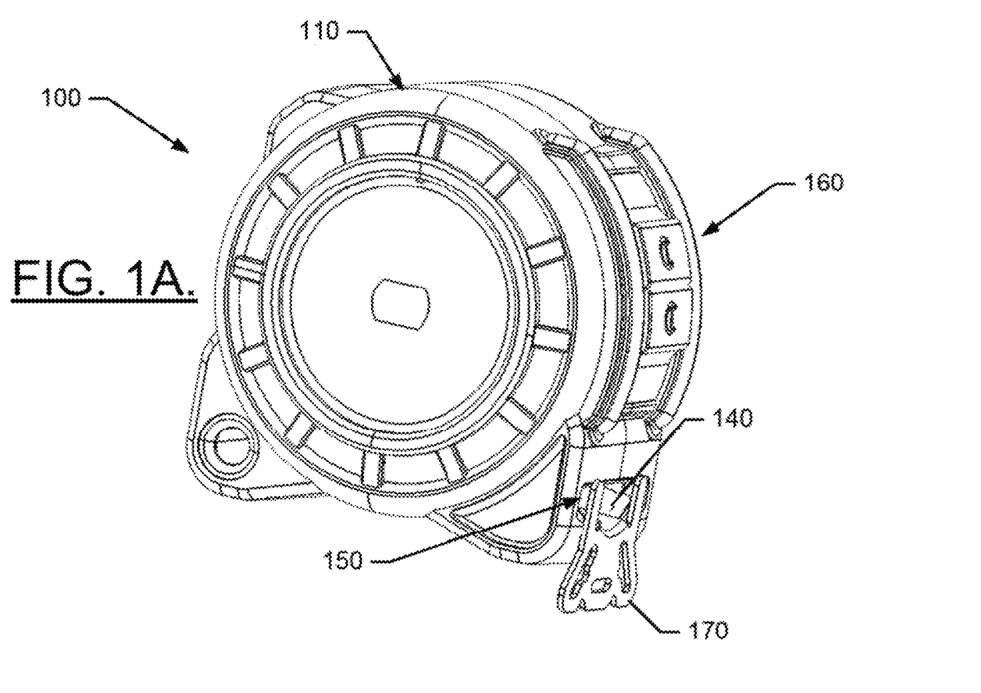
Figure 1B:
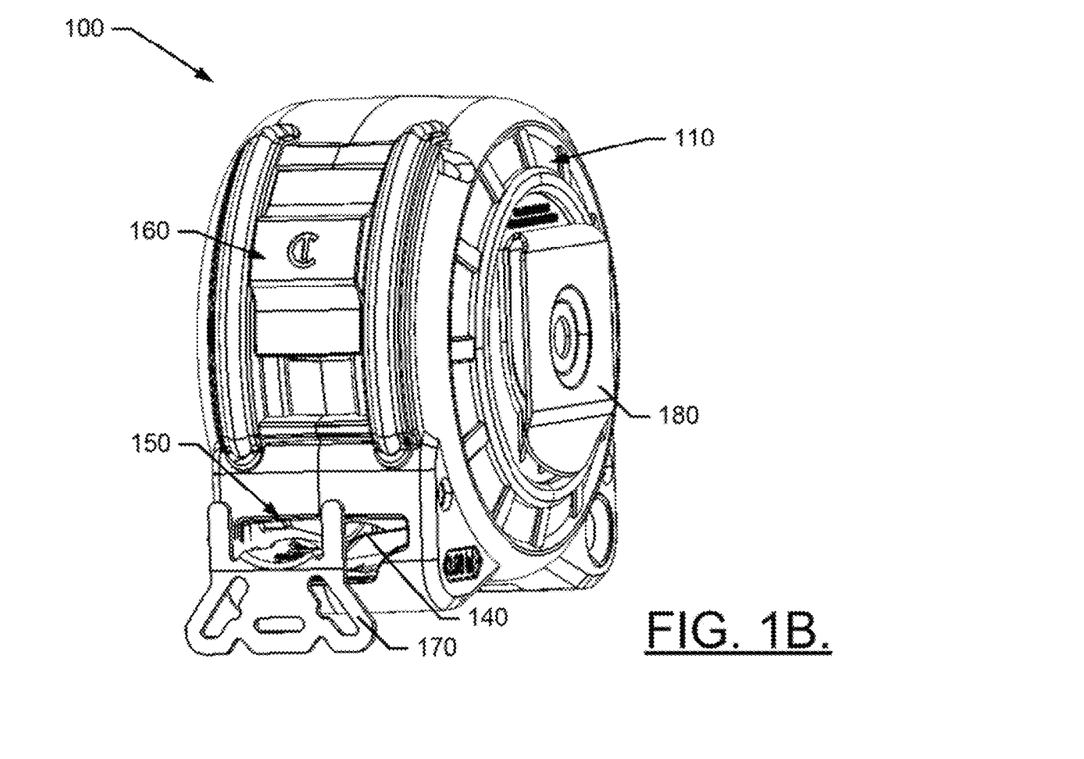
Figure 2:
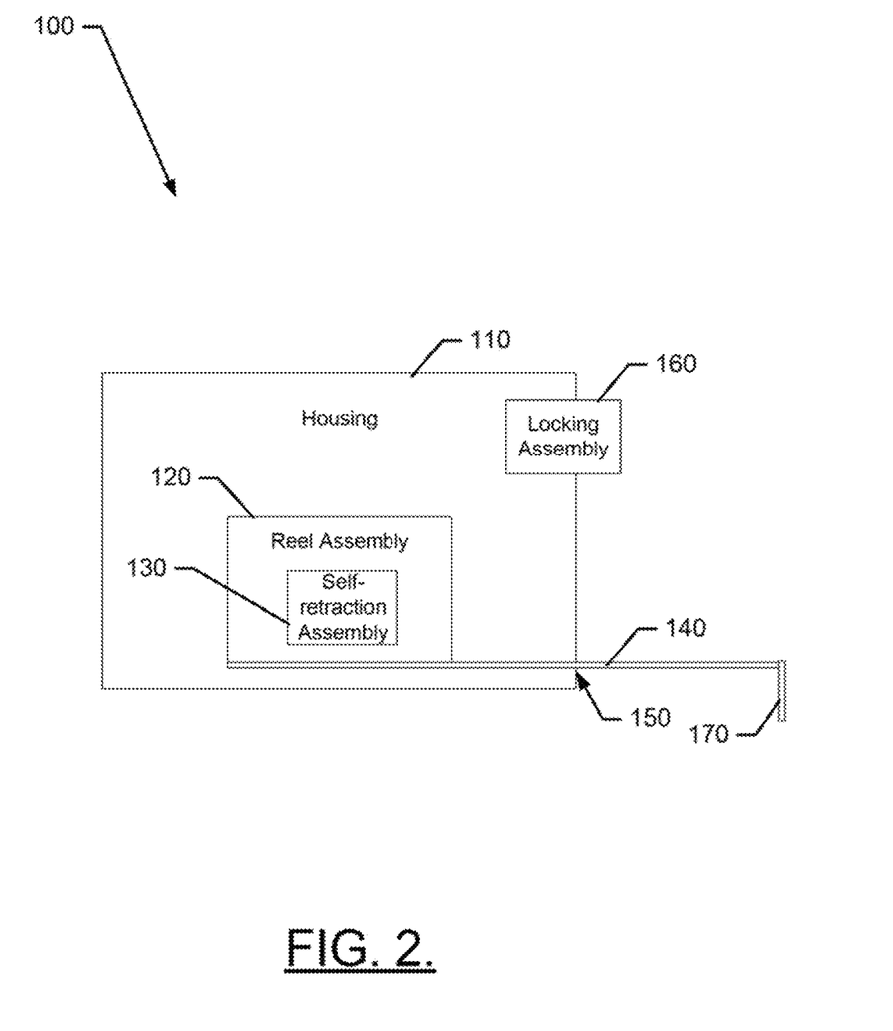
FIG. 2 illustrates a block diagram of the measuring tape device in accordance with an example embodiment.

FIG. 1, which is defined by FIGS. 1A and 1B, illustrates perspective views of the front and back of a measuring tape device, and FIG. 2 illustrates a block diagram of such device, in accordance with an example embodiment. Referring now to FIGS. 1 and 2, a measuring tape device 100 of an example embodiment may include a housing 110 inside which a reel assembly 120 and a self-retraction assembly 130 may be provided. A blade 140 (or tape) portion of the device 100 may be wound onto the reel assembly 120. The blade 140 may be paid out through an aperture 150 formed in the housing 110. Although not required, in some cases, a locking assembly 160 may be provided to enable the reel assembly 120 to be locked to prevent the self-retraction assembly 130 from retracting the blade 140 when the locking assembly 160 is engaged.

The blade 140 has an end hook 170 disposed at one end thereof, and is affixed to the reel assembly 120 at the other end of the blade 140. The end hook 170 may be affixed (temporarily) to an anchor point on a medium that is to be measured. Once the end hook 170 is affixed to the anchor point, the blade 140 may be paid out of the aperture 150 and unwound from the reel assembly 120. When a desired length of the blade 140 has been paid out, the user can make any necessary markings, readings, etc., associated with measuring scale markings that may be printed on the blade 140. The measuring scale markings generally measure length from the end hook 170 in one or more units, with divisions and subdivisions of such units clearly marked on the blade 140.

By fixing the end hook 170 to the anchor point, the self-retraction assembly 130 (which may be spring loaded in some cases) may be prevented from retracting the paid out portions of the blade 140 into the housing 110 (via the aperture 150). Similarly, when the locking assembly 160 is engaged, a force (e.g., a pinching force) may be placed on the blade 140 to prevent retraction or motion of the reel assembly 120 may otherwise be inhibited to prevent the self-retraction assembly 130 from retracting the paid out portions of the blade 140. However, when the end hook 170 is not anchored and the locking assembly 160 is not engaged, the self-retraction assembly 130 may cause the reel assembly 120 to wind the blade 140 back onto the reel assembly 120.

In some embodiments, the housing 110 may be formed of half shells that are operably coupled to each other with a receiving space in between to receive the reel assembly 120 and the self-retraction assembly 130. As shown in FIG. 1B, the measuring tape device 100 may further include a retention clip 180, which may be operably coupled to one of the half shells of the housing 110. The retention clip 180 may be used to clip the measuring tape device 100 to a belt, pants, or other garment of the user. The retention clip 180 could, however, alternatively be clipped or attached to other devices, or structures to store or temporarily support the measuring tape device 100 by the retention clip.

As mentioned above, for a typical measuring tape, when the blade 140 is paid out through the aperture 150, the blade 140 will be extended until the end hook 170 is secured on some media to be measured. However, if the end hook 170 is not secured, the blade 140 will be retracted fully into the housing 110 until the end hook 170 is proximate to the aperture 150. At this point, substantially all of the blade 140 is within the housing 110 and only small portions of the blade 140 may be visible, and that visibility may be limited based on the size of the aperture 150. Accordingly, if the measuring tape device 100 is being displayed (packaged or otherwise) for marketing or for sale, the blade 140 will be almost completely invisible to the viewer or potential buyer.

Recently, many developments have been undertaken to improve the performance of measuring tape devices. Some of those developments may relate to the shape or structure of the blade 140. Other developments may relate to the markings or graphics that are provided on the top and/or bottom of the blade 140. Many of these features may, although possible to represent in images, be less interesting to users in such a 2D format than they would otherwise be if presented in a 3D format. Accordingly, some example embodiments may provide a product display mechanism by which the features of the blade 140, which are normally not exposed due to being hidden within the housing 110 due to blade retraction, can be made visible to viewers or potential buyers.

Figure 3A:
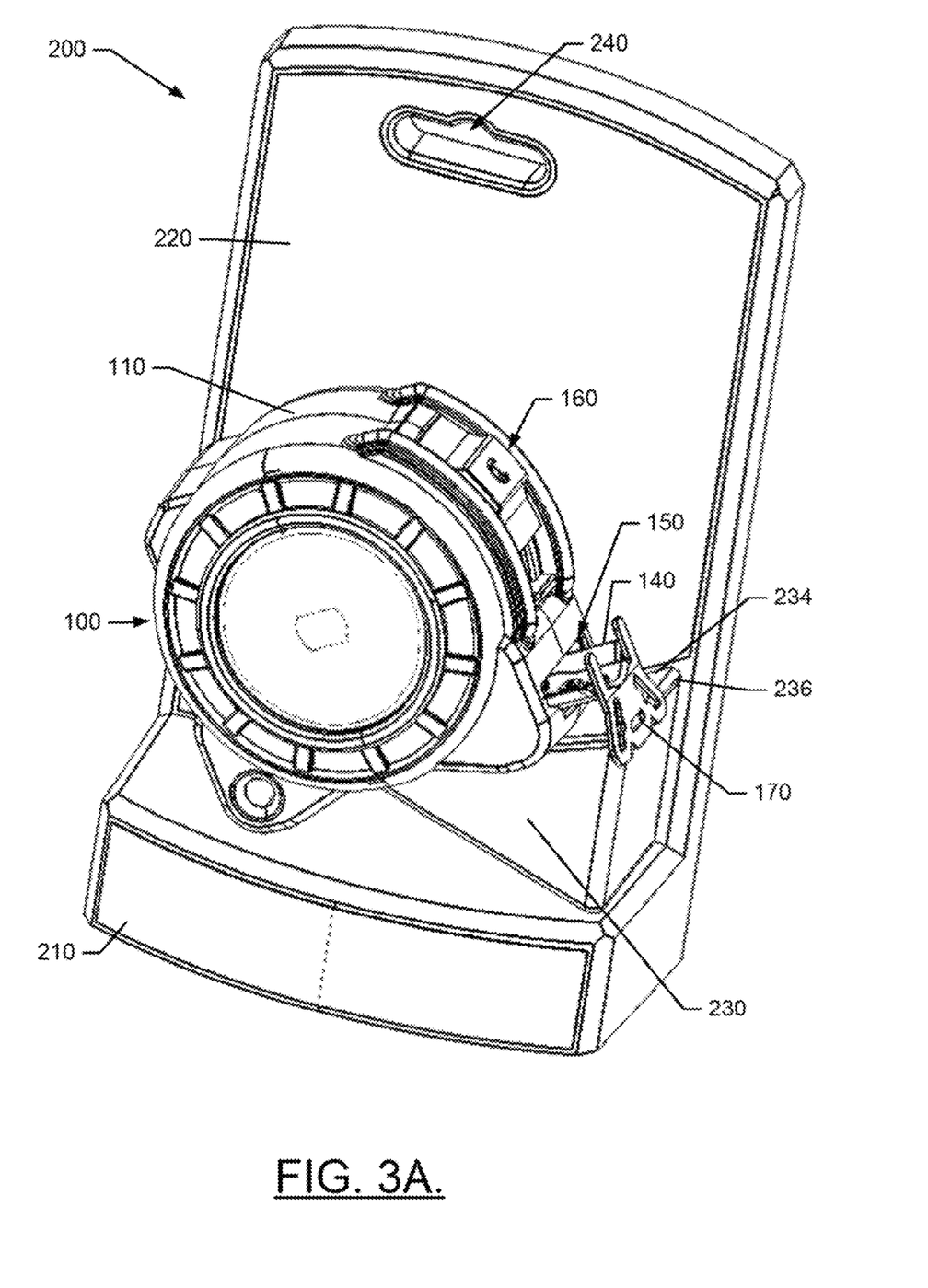
Figure 4:
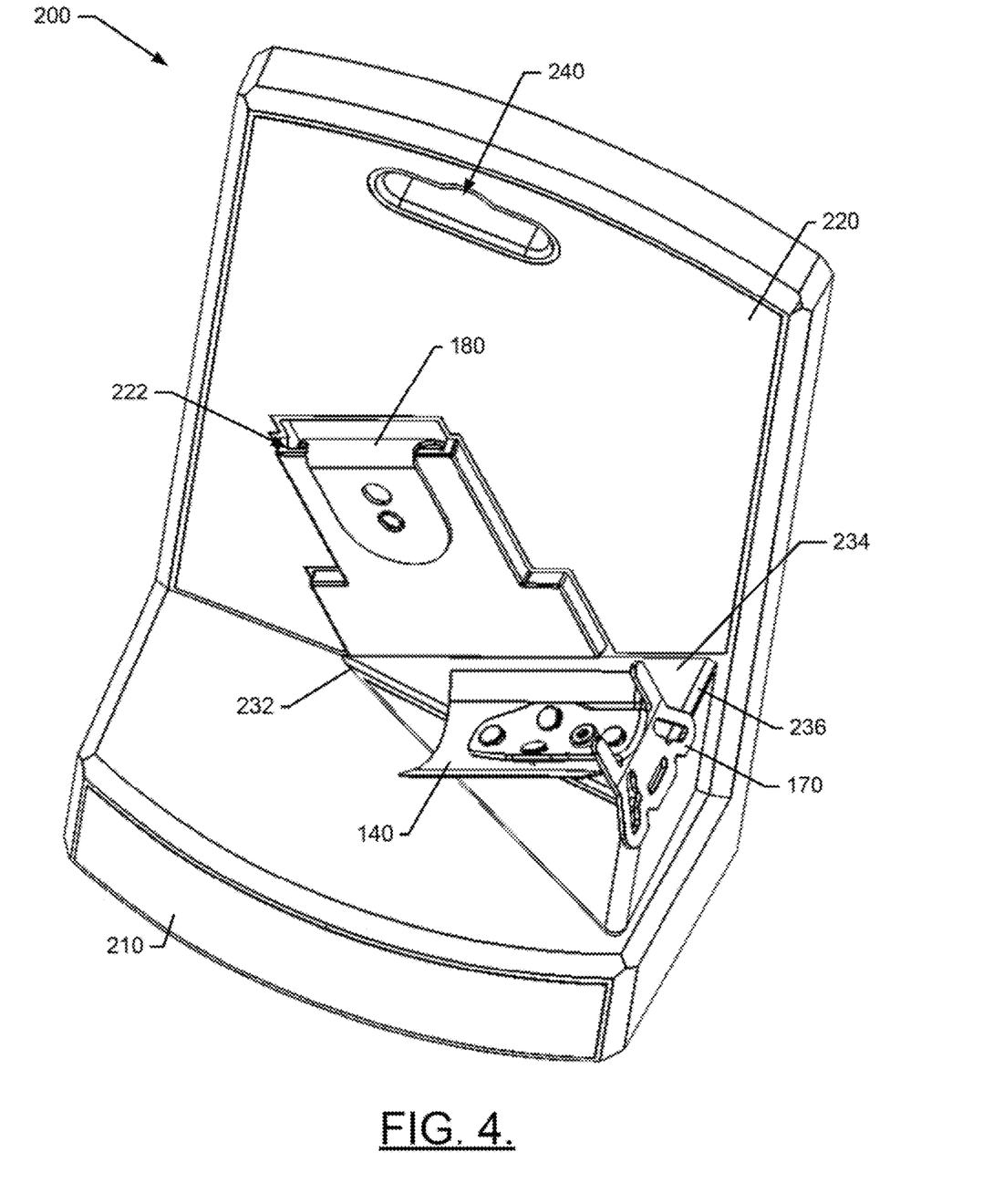
FIG. 4 illustrates a perspective view of the internal feature exposing holder operably coupled to isolated portions of the measuring tape device in accordance with an example embodiment.
Figure 5:
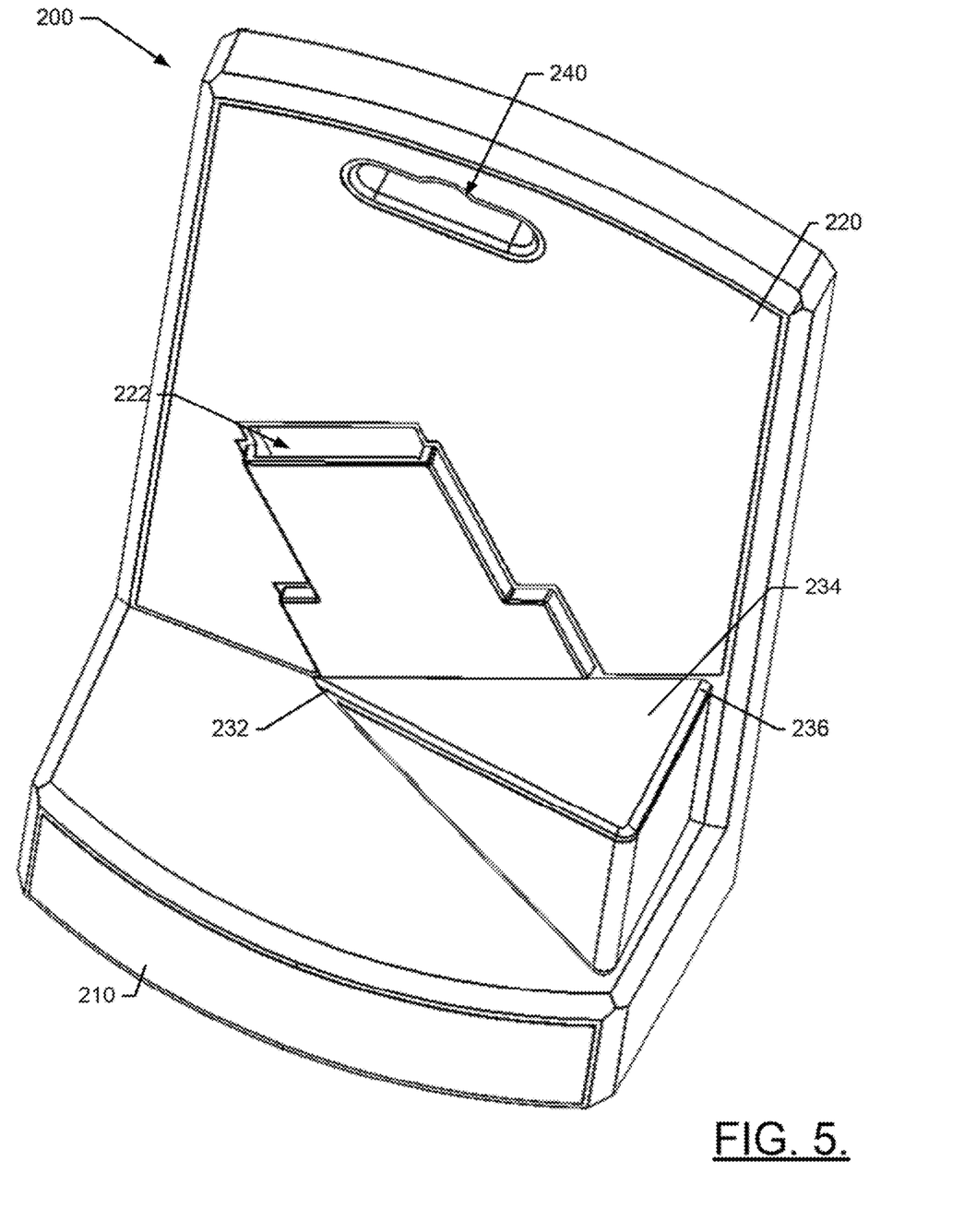
FIG. 5 illustrates a perspective view of a front of the internal feature exposing holder in accordance with an example embodiment.
Figure 6:
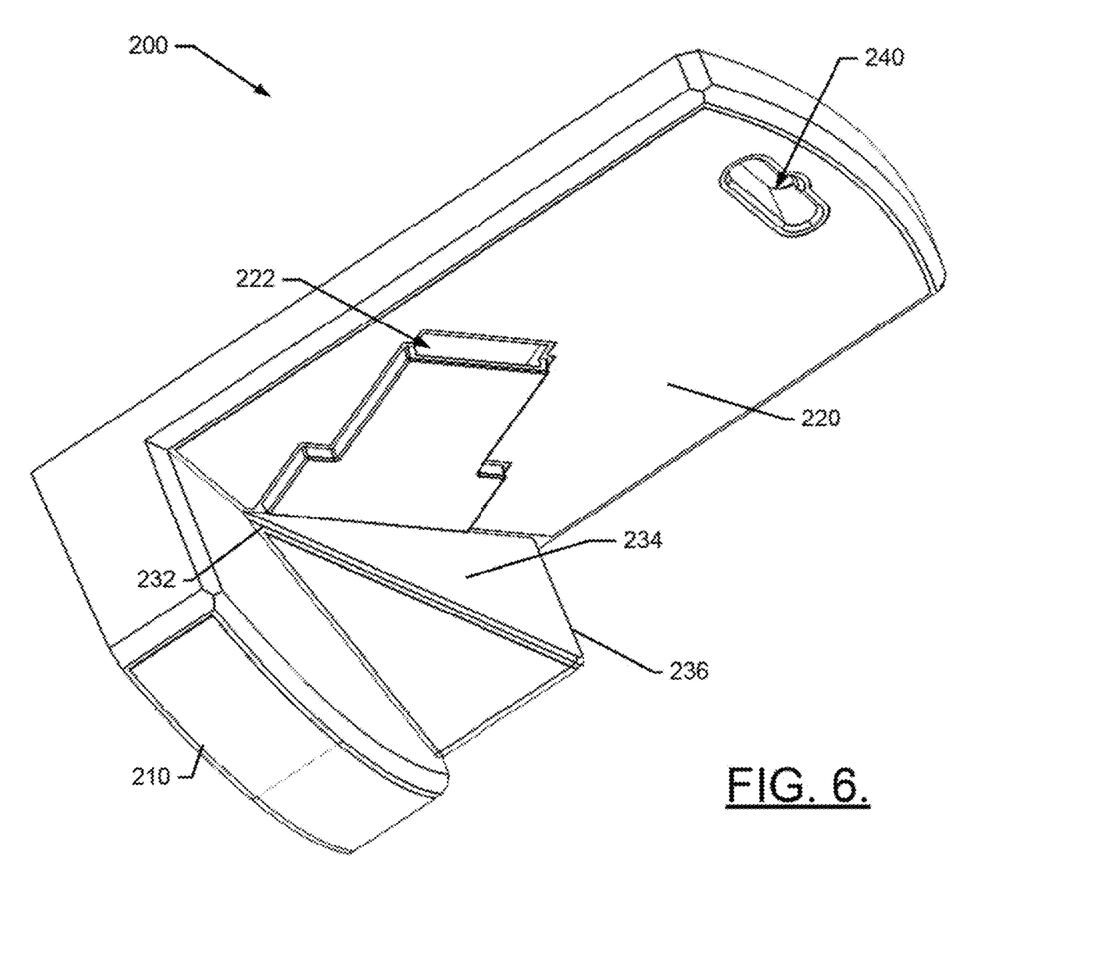
FIG. 6 illustrates a perspective view of a side of the internal feature exposing holder in accordance with an example embodiment.
Figure 7:
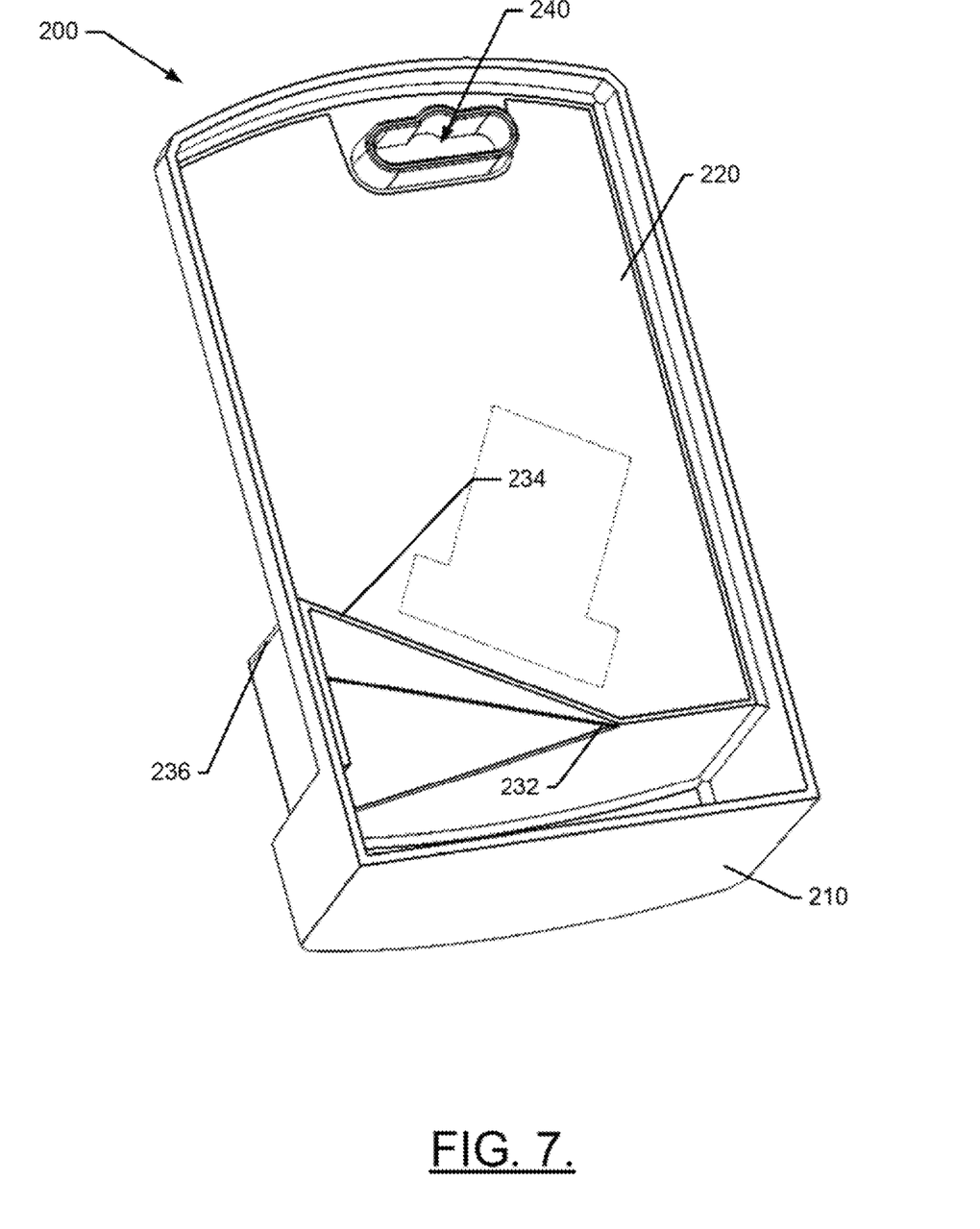
FIG. 7 illustrates a perspective view of a rear of the internal feature exposing holder in accordance with an example embodiment.

FIG. 3 illustrates a perspective view of the measuring tape device 100 operably coupled to an internal feature exposing holder 200 in accordance with an example embodiment. Meanwhile, FIG. 4 illustrates a perspective view of the internal feature exposing holder 200 and the connection points to the measuring tape device 100 in isolation to highlight the connection points. FIGS. 5-7 illustrate various perspective views of the internal feature exposing holder 200 in order to show the various structures and portions thereof.

Referring now to FIGS. 3-7, the internal feature exposing holder 200 may include a base portion 210 (or pedestal) that supports at least a portion of the housing 110 of the measuring tape device 100. The internal feature exposing holder 200 may also include a backing portion 220 that may extend substantially perpendicularly away from the base portion 210 to define a rear wall to which the measuring tape device 100 may be attached. In this regard, the retention clip 180 of the measuring tape device 100 may be operably coupled to (i.e., clipped to) a reception sleeve 222 formed in the backing portion 220. Thus, while the housing 110 may be supported at least in part (i.e., in the vertical direction) by the base portion 210, the housing 110 may also be supported at least in part (e.g., primarily in the lateral or horizontal direction) by the connection of the retention clip 180 to the reception sleeve 222. However, it should be appreciated that, in some cases, the retention clip 180 could be the primary connection point for the housing 110 to the internal feature exposing holder 200 and support could be provided thereby in both vertical and horizontal (or lateral) directions.

As shown in FIGS. 3-7, an extension portion 230 may be provided at one or both of (e.g., proximate to at least a portion of the intersection between) the base portion 210 and the backing portion 220. In some cases, the base portion 210, the backing portion 220 and the extension portion 230 may be formed from the same material. For example, the base portion 210, the backing portion 220 and the extension portion 230 may be molded together from plastic, resin or a similar rigid or semi-rigid material. As such, each of the base portion 210, the backing portion 220 and the extension portion 230 may be portions of a single unitary structure. Other materials such as plastic, cardboard, paper and/or the like may be attached to various parts of the base portion 210, the backing portion 220 and/or the extension portion 230 to complete the assembly of the internal feature exposing holder 200 or provide graphics, marketing materials, and/or the like to accompany the assembly of the internal feature exposing holder 200.

In this example, the extension portion 230 may be substantially pyramid shaped (albeit tipped on one lateral side of the pyramid). However, a wedge shaped extension portion 230 could be substituted in some cases. An apex 232 of the extension portion 230 may be formed at the intersection between the base portion 210 and the backing portion 220. However, if the extension portion 230 is formed as a wedge instead of a pyramid shaped structure, then it should be appreciated that the apex 232 may extend along the base portion 210 away from the backing portion 220. In any case, the apex 232 is an apex of the corresponding shape, which is tipped on its side. Thus, the apex 232 is not the highest point of the extension portion 230 but instead of the highest point of the shape (i.e., the pyramid or wedge) that is used to form the extension portion 230 before such shape is tipped on its side.

A supporting face 234 of the extension portion 230 may slope upwardly away from the base portion 210 at an angle until a hook capturing edge 236 is reached. As such, the supporting face 234 may extend from the apex 232 to the hook capturing edge 236. Moreover, the hook capturing edge 236 may form the highest point of the extension portion 230 and therefore be an apex of the extension portion (although it is a base corner of the shape that forms the extension portion 230). The hook capturing edge 236 may be recessed inwardly from lateral edges of the backing portion 220 and/or the base portion 210. However, in some cases, the hook capturing edge 236 may be flush with the lateral edges of the backing portion 220 and/or the base portion 210.

Figure 3B:
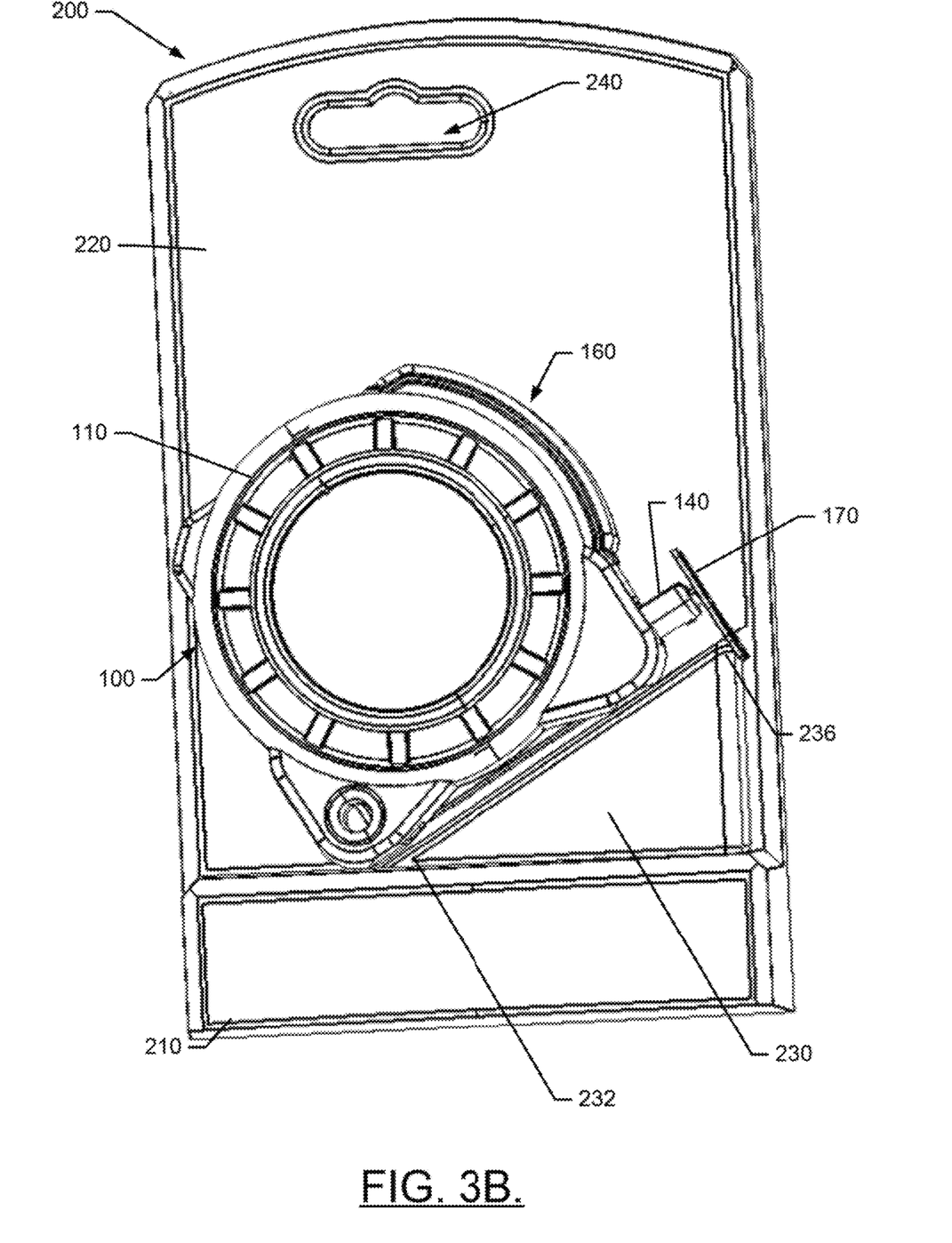

As can be appreciated best from FIG. 3B, a length of the supporting face 234 (i.e., as measured from the apex 232 to the hook capturing edge 236) may be longer than a length of the housing 110. Accordingly, when the end hook 110 is hooked on the hook capturing edge 236 and the retention clip 180 is inserted into the reception sleeve 222 so that the housing 110 also rests on the base portion 210, at least a portion of the blade 140 (e.g., about one inch or less) is necessarily extended out of the aperture 150 and therefore visible or exposed. Accordingly, a viewer can see (in 3D) any features or characteristics of the blade 140 (including both the top and bottom of the exposed portion of the blade 140) that may be part of the marketing efforts used to attract potential buyers. Moreover, the exposed portion of the blade 140 is kept visible without relying on the locking assembly 160. In this regard, if the locking assembly 160 was otherwise used to expose a portion of the blade 140, any potential buyer could release the locking assembly 160 and the exposed portion of the blade 140 would quickly be drawn up into the housing 110 by the self-retraction assembly 130.

In this example, the base portion 210 may have a width (as measured in a direction extending perpendicularly away from the backing portion 220) that is at least as wide as the axial width of the housing 110 (e.g., as measured in reference to an axis of the reel assembly 120). The backing portion 220 may further be provided with a receiving orifice 240 that may be punched or otherwise formed therein. The receiving orifice 240 could have a circular, oval or sombrero shape, and may enable the internal feature exposing holder 200 to be hung (e.g., on a peg or hook). Vertical and horizontal directions may therefore be defined for the internal feature exposing holder 200 in reference to directions assumed while hanging from the receiving orifice 240. Thus, the longitudinal centerline of the internal feature exposing holder 200 may be understood to define a vertical axis of the internal feature exposing holder 200, which may bisect the backing portion 220 and the base portion 210. The base portion 210 may form a substantially flat surface that lies in a plane substantially perpendicular to the vertical axis and substantially parallel to the horizontal axis of the internal feature exposing holder 200.

Based on the description above, it can be appreciated that the supporting face 234 of the extension portion 230 extends at an angle (i.e., an obtuse angle) relative to the portion of the base portion 210 that supports the housing 110. Thus, the housing 110 is supported at an angle on the supporting face 234 relative to both the vertical and horizontal axis. The reception sleeve 222 is therefore also formed at an angle relative to the vertical axis of the internal feature exposing holder 200. The angle of the reception sleeve 222 is an acute angle when measured from the portion of the vertical axis that is located above the supporting face 234.

When the housing 110 is supported on the supporting face 234, and the retention clip 180 is inserted into the reception sleeve 222, the bottom of the housing 110 extends from a location on the base portion 210 that is proximate to the apex 232, along the supporting face 234 toward the hook capturing edge 236. Thus, the bottom of the housing 110 extends at an angle relative to the base portion 210 such that a majority portion of the housing 110 is on one side of the vertical axis of the internal feature exposing holder 200. In order to account for the positioning of a majority of the housing 110, and therefore also the weight of the measuring tape device 100, on one side of the vertical axis, the receiving orifice 240 is also offset from the vertical axis to enable the top surface of the base portion 210 to remain substantially horizontal (i.e., parallel to the horizontal axis) when the internal feature exposing holder 200 is suspended from a peg or hook. The exposed portion of the blade 140 therefore also extends an the same angle formed by the supporting face 234 with the base portion 210.

In an example embodiment, an outer plastic cover may be mated with the base portion 210 and/or the backing portion 220 to retain the measuring tape device 100 on the internal feature exposing holder 200. The outer plastic cover may include or be replaced with shrink-wrap or other retaining materials or structures. In some cases, the outer plastic cover may substantially match a shape of (and mate with) the base portion 210 and the backing portion 220 except that the outer plastic cover may further include a space for accommodating the housing 110 of the measuring tape device 100 when the housing 110 is supported on the base portion 210 and the supporting face 234 as described above. Moreover, in some cases, even if the outer plastic cover is employed to retain the housing 110, the outer plastic cover may include a blade window defined therein so that the blade 140 is visible and accessible to the viewer (i.e., the end hook 170 could be grasped for further extension of and inspection of the blade 140 and features thereon). Thus, for example, internal features (e.g., color of the blade 140, markings thereon, finish, units employed on the blade markings, etc.) that are normally not visible due to the blade 140 being retracted into the housing 110, can be seen and appreciated by the viewer. The style, construction or other features of the end hook 170 can also be appreciated and accessed to otherwise give the viewer as much information about features of the measuring tape device 100 as possible, while still enabling the measuring tape device 100 to be effectively displayed in packaging that can have security components, marketing materials and/or the like attached thereto.

Figure 8:
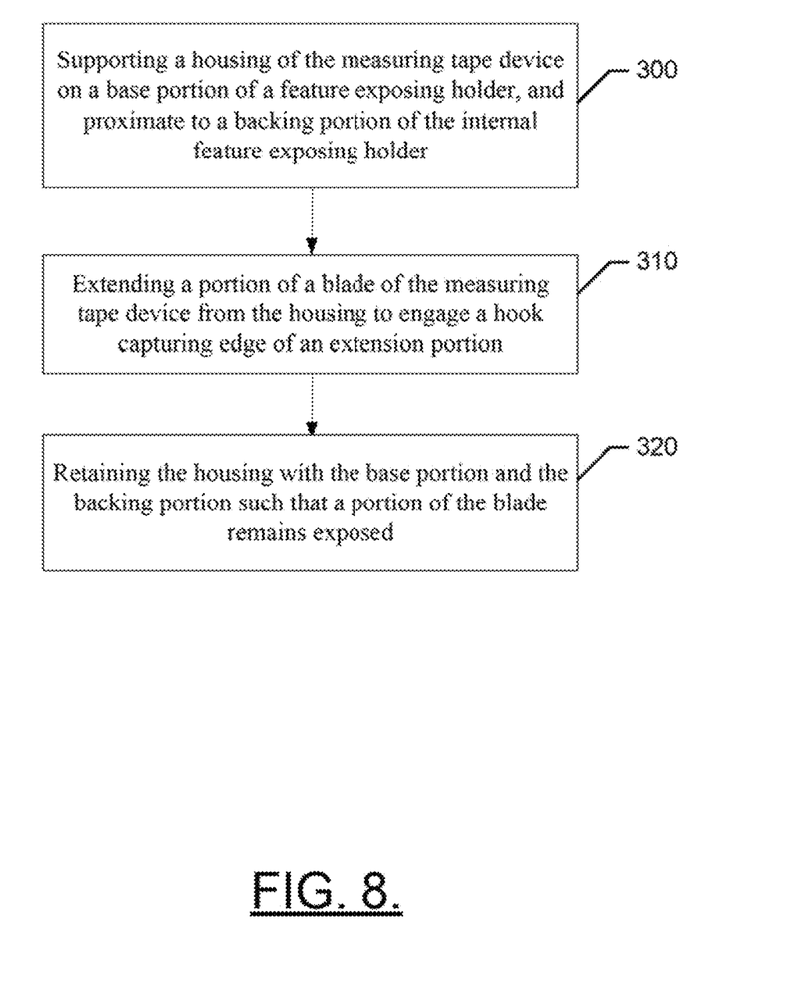
FIG. 8 illustrates a method of displaying a measuring tape device to expose an internal feature in accordance with an example embodiment.

Accordingly, a method of packaging a measuring tape device for sale may include, as shown in the block diagram of FIG. 8, supporting a housing of the measuring tape device on a base portion of a feature exposing holder, and proximate to a backing portion of the internal feature exposing holder at operation 300. This supporting may include sliding the retention clip 180 into the reception sleeve 222 formed in the backing portion 220. The method may further include extending a portion of the blade from the housing to engage a hook capturing edge of an extension portion at operation 310. The method may further include retaining the housing with the base portion and the backing portion such that a portion of the blade remains exposed at operation 320. This retention may include shrink-wrap or application of an outer plastic cover in some cases.

Accordingly, an internal feature exposing holder assembly for exposing an internal feature of a measuring tape device retained in the assembly may be provided. The assembly may include a base portion having a surface extending in a horizontal direction, a backing portion extending substantially perpendicularly away from the surface of the base portion, and an extension portion formed at an intersection between the base portion and the backing portion. The extension portion may include a supporting face formed to extend away from the base portion to a hook capturing edge. A length of the supporting face may be longer than a length of a housing of the measuring tape device such that a portion of a blade of the measuring tape is exposed from the housing when an end hook of the measuring tape device is operably coupled to the hook capturing edge and the housing is supported, at least in part, by the base portion.

In some cases, the assembly (or features or portions thereof) may be augmented or modified, or additional optional features/portions may be included. For example, in some cases, the extension portion may be formed at a first angle relative to the surface of the base portion. In an example embodiment, the extension portion may have a pyramid shape, and an apex of the pyramid shape may be formed at the intersection between the base portion and the backing portion. In some cases, a width of the supporting face may increase as distance from the apex increases. In an example embodiment, the backing portion may further include a reception sleeve configured to receive a retention clip of the measuring tape device. In some cases, the reception sleeve may extend at a second angle relative to a vertical axis of the backing portion. In an example embodiment, the first and second angles may be substantially equal to each other. In some cases, the first and second angles may each be formed to be between 10 degrees and 40 degrees. In an example embodiment, the measuring tape device may include a locking assembly and, the portion of the blade that is exposed from the housing may remain exposed without locking the locking assembly. In some cases, the portion of the blade that is exposed may be less than one inch. In an example embodiment, the backing portion may include a receiving orifice formed therein, and the receiving orifice may be formed off center relative to a vertical axis of the backing portion. In some cases, the base portion may have a width larger than an axial width of the measuring tape device. In an example embodiment, an outer plastic cover may be operably coupled to the backing portion and the base portion to retain the measuring tape device to the backing portion and the base portion. In some cases, the backing portion, the base portion and the extension portion may be formed of plastic or resin. In an example embodiment, the backing portion, the base portion and the extension portion are molded, for example, as a single unitary piece.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An internal feature exposing holder assembly for exposing an internal feature of a measuring tape device retained in the assembly, the assembly comprising:
   a base portion having a surface extending in a horizontal direction;
   a backing portion extending substantially perpendicularly away from the surface of the base portion; and
   an extension portion formed at one or both of the base portion and the backing portion, the extension portion including a supporting face formed to extend away from the base portion to a hook capturing edge,
   wherein a length of the supporting face is longer than a length of a housing of the measuring tape device such that a portion of a blade of the measuring tape is exposed from the housing when an end hook of the measuring tape device is operably coupled to the hook capturing edge and the housing is supported, at least in part, by the base portion.

2. The assembly of claim 1, wherein the extension portion is formed at a first angle relative to the surface of the base portion.

3. The assembly of claim 2, wherein the extension portion has a pyramid shape, and an apex of the pyramid shape is formed at the intersection between the base portion and the backing portion.

4. The assembly of claim 3, wherein a width of the supporting face increases as distance from the apex increases.

5. The assembly of claim 2, wherein the backing portion further comprises a reception sleeve configured to receive a retention clip of the measuring tape device.

6. The assembly of claim 5, wherein the reception sleeve extends at a second angle relative to a vertical axis of the backing portion.

7. The assembly of claim 6, wherein the first and second angles are substantially equal to each other.

8. The assembly of claim 6, wherein the first and second angles are each formed between 10 degrees and 40 degrees.

9. The assembly of claim 1, wherein the portion of the blade that is exposed is less than one inch.

10. The assembly of claim 1, wherein the backing portion comprises a receiving orifice formed therein, and wherein the receiving orifice is formed off center relative to a vertical axis of the backing portion.

11. The assembly of claim 1, wherein the base portion has a width larger than an axial width of the measuring tape device.

12. The assembly of claim 1, wherein the backing portion, the base portion and the extension portion are formed of plastic or resin.

13. The assembly of claim 12, wherein the backing portion, the base portion and the extension portion are molded.

14. The assembly of claim 12, wherein the backing portion, the base portion and the extension portion are formed as a single unitary piece.

15. A system comprising the internal feature exposing holder assembly of claim 1 and the tape measure.

16. The assembly of claim 1, wherein the housing is in physical contact with and supported, at least in part, by the surface of the base portion.

17. An internal feature exposing holder assembly for exposing an internal feature of a measuring tape device retained in the assembly, the assembly comprising:
a base portion having a surface extending in a horizontal direction;
a backing portion extending substantially perpendicularly away from the surface of the base portion; and
an extension portion formed at one or both of the base portion and the backing portion, the extension portion including a supporting face formed to extend away from the base portion to a hook capturing edge;
wherein a length of the supporting face is longer than a length of a housing of the measuring tape device such that a portion of a blade of the measuring tape is exposed from the housing when an end hook of the measuring tape device is operably coupled to the hook capturing edge and the housing is supported, at least in part, by the base portion;
wherein an outer plastic cover is operably coupled to the backing portion and the base portion to retain the measuring tape device to the backing portion and the base portion.

18. A method of packaging a measuring tape device such that an internal feature of the measuring tape device is exposed, the method comprising:
supporting a housing of the measuring tape device on a horizontal surface of a base portion of an internal feature exposing holder and an angled supporting face of an extension portion, the housing being supported proximate to a backing portion of the internal feature exposing holder, the backing portion extending substantially perpendicularly away from the surface of the base portion, the extension portion extending from both the horizontal surface of the base portion and the backing portion;
extending a portion of a blade of the measuring tape device from the housing to engage a hook capturing edge of the extension portion; and
retaining the housing with the base portion and the backing portion such that a portion of the blade remains exposed.

19. The method of claim 18, wherein supporting the housing further comprises engaging a retention clip with a reception sleeve formed in the backing portion.

20. The method of claim 18, wherein retaining the housing comprises applying a shrink-wrap or an outer plastic cover over the housing, the base portion and the backing portion.

* * * * *